(12) United States Patent
Shin

(10) Patent No.: US 7,724,268 B2
(45) Date of Patent: May 25, 2010

(54) LIQUID CRYSTAL DISPLAY

(75) Inventor: Yong-Hwan Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 700 days.

(21) Appl. No.: 11/620,236

(22) Filed: Jan. 5, 2007

(65) Prior Publication Data

US 2007/0182897 A1    Aug. 9, 2007

(30) Foreign Application Priority Data

Feb. 7, 2006    (KR) .................. 10-2006-0011450

(51) Int. Cl.
*G09G 5/10* (2006.01)

(52) U.S. Cl. .................. 345/690; 345/89; 345/698; 349/84

(58) Field of Classification Search .......... 345/89, 345/690, 698
See application file for complete search history.

(56) References Cited

U.S. PATENT DOCUMENTS

| 5,333,243 | A  | * | 7/1994 | Best et al. ............... 358/1.9 |
| 6,128,061 | A  | * | 10/2000 | Lee et al. ............... 349/141 |
| 7,019,795 | B2 | * | 3/2006 | Jones ..................... 349/33 |
| 7,187,392 | B2 | * | 3/2007 | Ito ....................... 345/690 |
| 7,573,449 | B2 | * | 8/2009 | Aoki ..................... 345/89 |
| 2003/0016199 | A1 | * | 1/2003 | Lee et al. ............... 345/88 |
| 2003/0058211 | A1 | * | 3/2003 | Kim et al. ............... 345/89 |
| 2006/0038952 | A1 | * | 2/2006 | Chang et al. ............ 349/139 |

* cited by examiner

*Primary Examiner*—Richard Hjerpe
*Assistant Examiner*—Sahlu Okebato
(74) *Attorney, Agent, or Firm*—F. Chau & Associates, LLC

(57) ABSTRACT

A liquid crystal display is provided. The liquid crystal display has a plurality of pixels and includes a first substrate, a second substrate that is opposite to the first substrate, and a liquid crystal layer that is interposed between the first and second substrates. A phase retardation of the liquid crystal layer ranges from about 420 nm to about 500 nm.

20 Claims, 5 Drawing Sheets

FIG.5

LIQUID CRYSTAL DISPLAY

CROSS-REFERENCE TO RELATED PATENT APPLICATION

This application claims priority to Korean Patent Application No. 10-2006-0011450, filed in the Korean Intellectual Property Office, on Feb. 7, 2006, the disclosure of which is incorporated by reference herein.

BACKGROUND OF THE INVENTION (a) Technical Field

The present invention relates to a liquid crystal display, and more particularly to a liquid crystal display with a reduced power consumption.

(b) Discussion of the Related Art

A liquid crystal display includes two display panels provided with field generating electrodes and a liquid crystal disposed between the two panels. The field generating electrodes may include a plurality of pixel electrodes and a common electrode. Voltages are applied to the field generating electrodes to generate an electric field in the liquid crystal layer. The electric field determines the alignment of liquid crystal molecules in the liquid crystal layer. These molecular orientations in turn determine the transmittance of light passing through the liquid crystal layer, thereby displaying an image by controlling the polarization of incident light.

In such a liquid crystal display, an image signal for a primary color such as red, green, and blue is input from an external graphics source. A signal controller of the liquid crystal display properly processes the image signal and then supplies the processed signal to a data driver consisting of integrated circuits (ICs). The data driver selects an analog gray voltage which corresponds to the applied image signal to be applied to a liquid crystal panel assembly.

The power consumption of liquid crystal displays can be reduced in several ways, including, for example, by increasing the aperture ratio, by using a high efficiency backlight, by increasing the driving voltage, and by increasing the phase retardation of the liquid crystal. However, typically if the phase retardation of the liquid crystal is increased, when the liquid crystal display represents a white gray, a yellowish phenomenon may occur where the screen appears yellow.

Thus, there is a need for a liquid crystal display which uses less power by increasing the phase retardation of its liquid crystal, but also does not suffer from the yellowish phenomenon.

SUMMARY OF THE INVENTION

An exemplary embodiment of the present invention provides a liquid crystal display having a plurality of pixels, including a first substrate, a second substrate that is opposite to the first substrate, an a liquid crystal layer that is interposed between the first and second substrates. A phase retardation of the liquid crystal layer ranges form about 420 nm to about 500 nm.

The liquid crystal display may operate in a first display mode if the number of pixels among the plurality of pixels representing a white gray is in a first range of predetermined values which is less than a second range of predetermined values. The liquid crystal display may operate in a second display mode if the number of pixels representing the white gray is greater than or equal to the second range of predetermined values. A gray value of a pixel in the second display mode may be less than that of a pixel in the first display mode.

The liquid crystal display may be a normal white or black mode. A voltage of a pixel in the second display mode may be higher or lower than that of a pixel in the first display mode. The gray value of the second display mode may be determined through a dithering process.

The liquid crystal display may further include an image signal converter that converts an input image signal of a first gray to an output image signal of a second gray and outputs the image signal of the second gray. The input image signal may have a first bit count and the image signal converter may add a second bit count of a weighted image signal to the first bit count to convert the input image signal to a corrected image signal having a third bit count. The image signal converter may store a plurality of dithering data patterns including data elements having a first value or a second value, select a dithering data pattern corresponding to the second bit count of the corrected image signal among the plurality of dithering data patterns, and output the corrected image signal after converting it to an output image signal of a fourth bit count that is less than the third bit count based on the selected dithering data pattern. The image signal converter may further comprise a lookup table that stores the plurality of dithering data patterns and a dithering controller that outputs the corrected image signal based on the plurality of dithering data patterns that are stored in the lookup table.

BRIEF DESCRIPTION OF THE DRAWINGS

The embodiments of the present invention will become more apparent by describing in detail exemplary embodiments thereof with reference to the attached drawings, in which:

FIG. 3 is a block diagram schematically illustrating an image signal converter of the liquid crystal display according to an exemplary embodiment of the present invention;

FIG. 5 is a view illustrating a dithering data pattern according to an exemplary embodiment of the present invention.

DETAILED DESCRIPTION OF EXEMPLARY EMBODIMENTS

Figure 1:
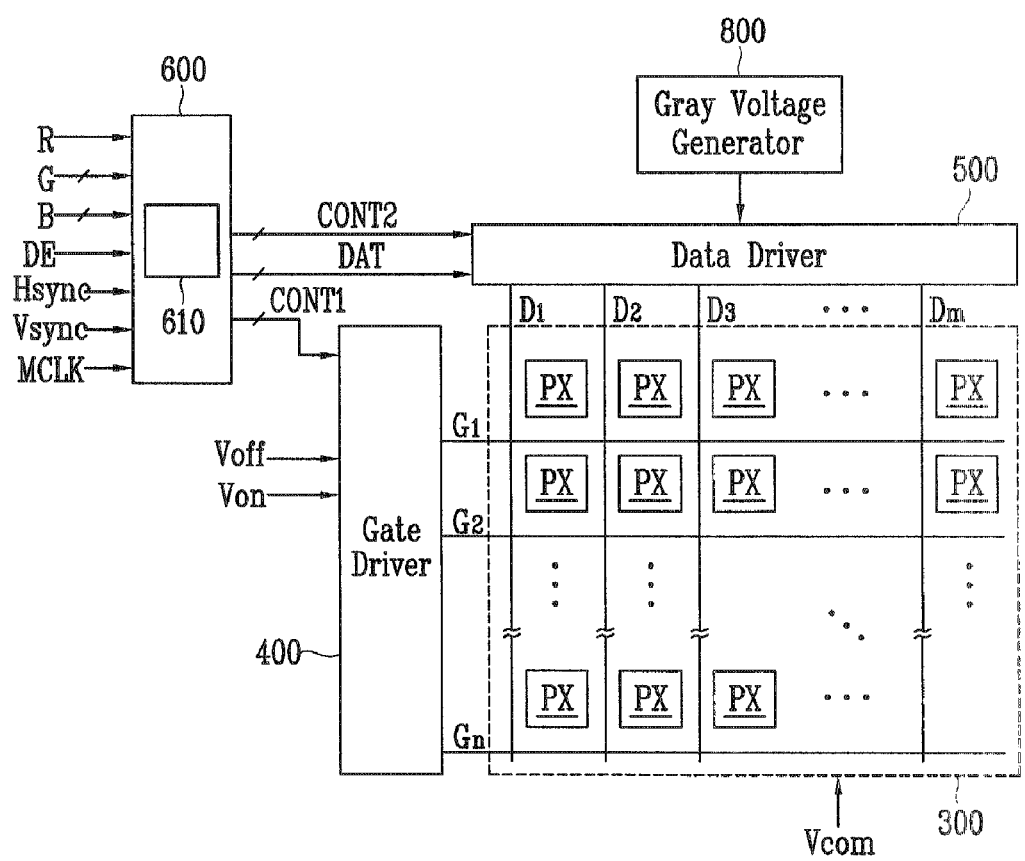
FIG. 1 is a block diagram of a liquid crystal display according to an exemplary embodiment of the present invention.

Hereinafter, exemplary embodiments of the present invention will now be described in detail with reference to the accompanying drawings. This embodiment may, however, be embodied in many different forms and should not be construed as limited to the embodiments set forth herein.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. A liquid crystal display according to an exemplary embodiment of the present invention will be described in detail with reference to FIGS. 1 to 3.

Figure 2:
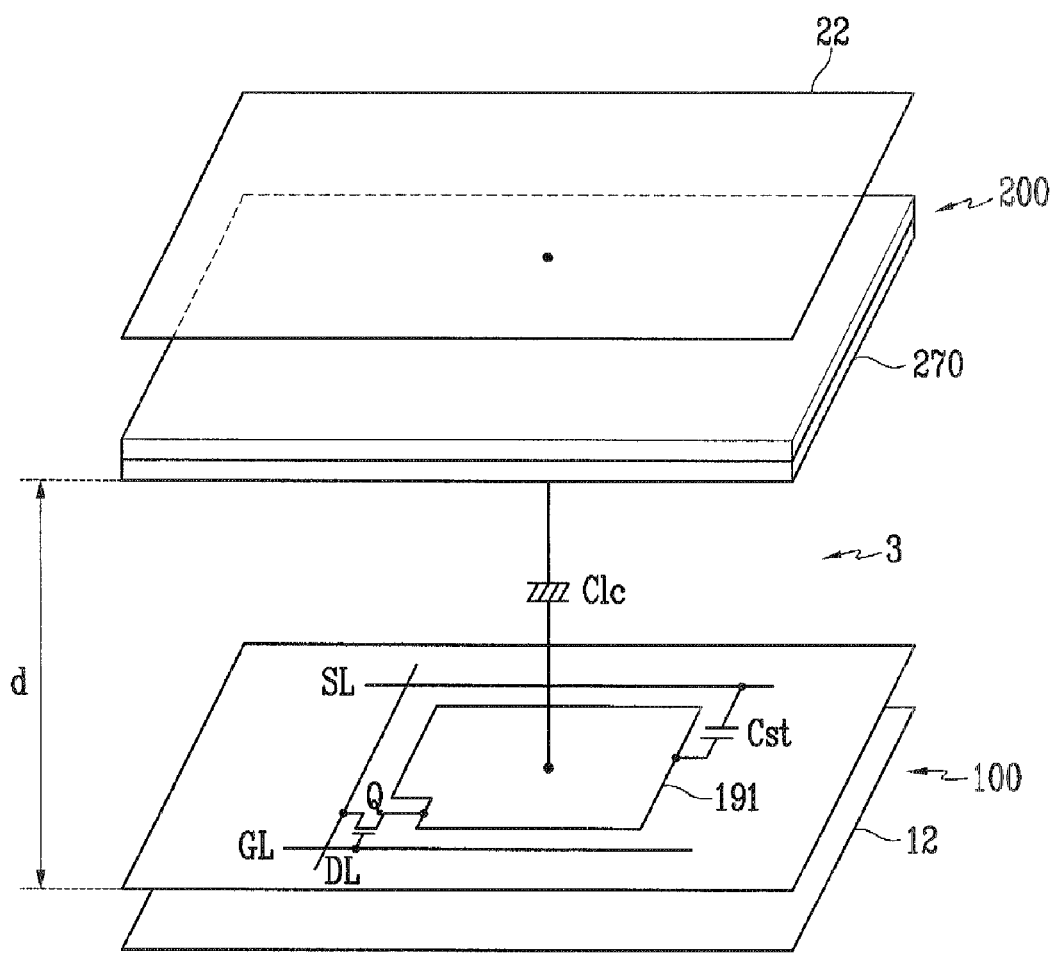
Figure 3:
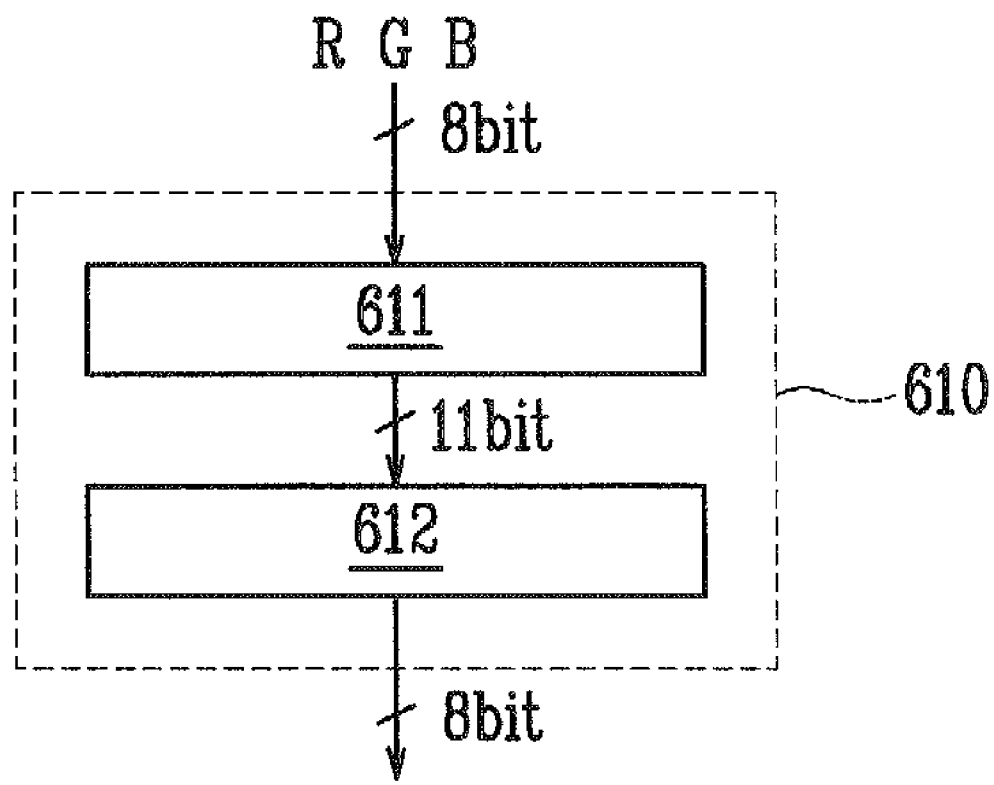
FIG. 3 is an equivalent circuit diagram of a pixel of the liquid crystal display according to an exemplary embodiment of the present invention.

FIG. 1 is a block diagram of a liquid crystal display according to an exemplary embodiment of the present invention. FIG. 2 is an equivalent circuit diagram of a pixel of the liquid crystal display according to an exemplary embodiment of the present invention, and FIG. 3 is a block diagram illustrating an image signal converter of the liquid crystal display according to an exemplary embodiment of the present invention.

As shown in FIG. 1, the liquid crystal display includes a liquid crystal panel assembly 300, a gate driver 400 and a data driver 500 that are connected thereto, a gray voltage generator 800 that is connected to the data driver 500, and a signal controller 600 that controls the gate driver 400 and the gate driver 500.

The liquid crystal panel assembly 300 includes a plurality of signal lines $G_1$-$G_n$ and $D_1$-$D_m$, and a plurality of pixels PX that are connected thereto and arranged in approximately a matrix shape. As shown in FIG. 2, the liquid crystal panel assembly 300 includes a lower panel 100 and a upper panel 200 that are opposite to each other, and a liquid crystal layer 3 that is interposed therebetween.

The signal lines $G_1$-$G_n$ and $D_1$-$D_m$ include a plurality of gate lines $G_1$-$G_n$ that transfers a gate signal (also referred to as a "scanning signal") and a plurality of data lines $D_1$-$D_m$ that transfers a data signal. The gate lines $G_1$-$G_n$ extend in approximately a row direction and are almost parallel to each other, and the data lines $D_1$-$D_m$ extend in approximately a column direction that are almost parallel to each other.

Each pixel PX, for example a pixel PX that is connected to an i-th (i=1, 2, . . . , n) gate line GL and a j-th (j=1, 2, . . . , m) data line DL includes a switching element Q that is connected to the signal lines GL and DL and a liquid crystal capacitor Clc and a storage capacitor Cst that are connected thereto. The storage capacitor Cst may be omitted as necessary.

The switching element Q is a three terminal element such as a thin film transistor that is provided in the lower panel 100. A control terminal thereof is connected to the gate line GL, an input terminal thereof is connected to the data line DL, and an output terminal thereof is connected to the liquid crystal capacitor Clc and the storage capacitor Cst.

The liquid crystal capacitor Clc has a pixel electrode 191 on the lower panel 100 and a common electrode 270 on the upper panel 200 as two terminals. The liquid crystal layer 3 between the pixel electrode 191 and the common electrode 270 functions as a dielectric material. The pixel electrode 191 is connected to the switching element Q and the common electrode 270 is formed on an entire surface of the upper panel 200 and receives a common voltage Vcom. Although the common electrode is illustrated in FIG. 2 as being provided in the upper panel 200, the common electrode may be alternately provided in the lower panel 100. When this occurs, at least one of two electrodes of the pixel electrode 191 and the common electrode 270 may be formed in a linear shape or a bar shape.

The storage capacitor Cst is formed with the overlap of a separate storage electrode line SL and the pixel electrode 191, and an insulator is interposed therebetween. A predetermined voltage such as a common voltage Vcom is applied to the storage electrode line SL. However, the storage capacitor Cst may be formed with the overlap of the pixel electrode 191 and a previous gate line directly on the electrode 191 via an insulator.

A color display can be represented by allowing each pixel PX to inherently display one of the primary colors (spatial division) or by sequentially and alternately displaying the primary colors (temporal division). A desired color is determined by the spatial or temporal sum of the primary colors. An example of a set of the primary colors includes red, green, and blue. FIG. 2 shows an example of spatial division in which each pixel PX is provided with a color filter (not shown) for displaying one of the primary colors in a region of the upper panel 200 corresponding to the pixel electrode 191.

The color filter may be provided on or under the pixel electrode 191 of the lower panel 100.

Polarizers 12 and 22 for polarizing light are attached to the outer surface of the liquid crystal panel assembly 300.

The liquid crystal layer 3 may have positive dielectric anisotropy or negative dielectric anisotropy.

A phase retardation value Δnd of the liquid crystal layer 3 ranges from about 420 nm to about 500 nm. Here, "Δn" represents the refractive anisotropy of the liquid crystal, and "d" represents the distance between the lower panel 100 and the upper panel 200, i.e., the thickness of the liquid crystal layer 3.

The range of phase retardation values of the liquid crystal layer 3 of the liquid crystal display, according to the present invention, is greater than that of conventional liquid crystal displays. As the phase retardation of the liquid crystal layer 3 increases, transmittance improves, and in turn, power consumption of the liquid crystal display decreases as compared to conventional liquid crystal displays. Referring to FIG. 1, the gray voltage generator 800 generates two gray voltage sets (or a reference gray voltage set) related to the transmittance of the pixels PX. One of the two sets has a positive value with respect to a common voltage Vcom and the other set has a negative value.

The gate driver 400 is connected to the gate lines $G_1$-$G_n$ of the liquid crystal panel assembly 300 to apply a gate signal. The gate signal includes a combination of a gate-on voltage Von and a gate-off Voff which control the switching transistor Qs of the gate lines $G_1$-$G_n$.

The data driver 500 is connected to the data lines $D_1$-$D_m$ of the liquid crystal panel assembly 300. The data driver 500 selects a gray voltage from the gray voltage generator 800, and applies the selected voltage as a data signal to the data lines $D_1$-$D_m$. However, when the gray voltage generator 800 does not supply a voltage for all grays, but supplies only a predetermined number of reference gray voltages, the data driver 500 divides the reference gray voltages to generate a gray voltage for all grays and selects a data signal among them.

The signal controller 600 includes an image signal converter 610.

The image signal converter 610 receives input image signals R, G, and B that are provided from an external graphics controller (not shown) and outputs a corrected image signal. The image signal converter 610 may be independently provided without being included in the signal controller 600. Referring to FIG. 3, the image signal converter 610 includes a data processor 611 and a dithering controller 612.

The data processor 611 converts P bits of an image signal that is input to the signal controller 600 up to a (P+Q) total bits to generate corrected image data and then performs dithering control on the corrected image data in the dithering controller 612. When a bit count of data that can be processed in the data driver 500 is less than that of the input image data, i.e., the corrected image data, the dithering control reconstructs the image data by selecting the upper bits (P) corresponding to the bit count that can be processed in the data driver 500 among the total bits (P+Q) of the corrected image data that are corrected in the data processor 611. The remaining lower bits (Q) of the total bits (P+Q) display as a temporal and spatial average of the upper bits (P).

The dithering controller 612 includes a lookup table (not shown), and the lookup table stores the corrected values of the image data for each pixel based on a value of a lower bit of the lower bits (Q) requiring the dithering control. A corrected value set corresponding to a basic pixel unit of the dithering control is called a dithering data pattern.

Each of the driving devices 400, 500, 600, and 800 may be directly mounted on the liquid crystal panel assembly 300 in the form of at least one IC chip, mounted on a flexible printed circuit film (not shown) to be attached to the liquid crystal panel assembly 300 in a form of a tape carrier package (TCP), or mounted on a separate printed circuit board (PCB) (not shown). Alternatively, the driving devices 400, 500, 600, and 800 along with the signal lines $G_1$-$G_n$ and $D_1$-$D_m$, the thin film transistor switching elements Q, may be integrated in the liquid crystal panel assembly 300. Furthermore, the driving devices 400, 500, 600, and 800 may be integrated in a single chip, and at least one among them or at least one circuit element constituting them may be provided outside of the single chip.

The signal controller 600 receives the input image signals R, G, and B and an input control signal that controls the display thereof from an external graphics controller (not shown). The input image signals R, G, and B have luminance information for each pixel PX. The luminance information includes a gray of a predetermined number, such as, for example 1024 (=$2^{10}$), 256 (=$2^8$), or 64 (=$2^6$). The input control signal includes, for example, a vertical synchronization signal Vsync, a horizontal synchronization signal Hsync, a main clock signal MCLK, and a data enable signal DE.

The signal controller 600 appropriately processes the input image signals R, G, and B depending on the operating conditions of the liquid crystal panel assembly 300. Based on the input image signals R, G, and B and the input control signal, the signal controller 600 generates a gate control signal CONT1, a data control signal CONT2, and then sends the gate control signal CONT1 to the gate driver 400 and sends the data control signal CONT2 and the processed image signal DAT to the data driver 500.

The image signal converter 610 converts the image data and performs dithering control using a dithering data pattern that is stored in the lookup table. If the bit count of the input image signals R, G, and B is 8, the bit count of the corrected image signal that is corrected in the data processor 611 is 11, and the bit count of data that the data driver 500 can process is 8. The dithering controller 612 corrects the upper 8 bits of data based on a dithering data pattern that is stored in the lookup table based on a data value of the lower 3 bits and then outputs the data as an output image signal DAT.

The output image signal DAT as a digital signal has one of a predetermined number of values (or grays) and includes image data that is made by performing dithering control on the corrected image data.

The gate control signal CONT1 may include a scanning start signal STV that instructs scanning to begin, a gate clock signal CPV that controls an output period of a gate-on voltage Von, and an output enable signal OE that limits the duration time of the gate-on voltage Von.

The data control signal CONT2 includes a horizontal synchronization start signal STH that indicates the transfer start of an output image signal DAT for one row of pixels PX, and a data clock signal HCLK and a load signal LOAD that apply a data signal to the data lines $D_1$-$D_m$. The data control signal CONT2 may further include an inversion signal RVS for inverting the voltage polarity of the data signal relative to the common voltage Vcom (i.e., the polarity of the data signal).

According to the data control signal CONT2 from the signal controller 600, the data driver 500 receives an output image signal DAT for one row of pixels PX, converts the output image signal DAT to an analog data signal by selecting a gray voltage corresponding to each output image signal DAT, and then applies the signal to corresponding data lines $D_1$-$D_m$.

The gate driver 400 applies a gate-on voltage Von to the gate lines $G_1$-$G_n$ based on the gate control signal CONT1 from the signal controller 600 to turn on the switching element Q that is connected to the gate lines $G_1$-$G_n$. Then, a data signal that is applied to the date lines $D_1$-$D_m$ is applied to a corresponding pixel PX through the turned-on switching element Q.

The difference between a voltage of a data signal that is applied to the pixel PX and a common voltage Vcom is represented as a charge voltage, i.e., a pixel voltage of the liquid crystal capacitor Clc. Liquid crystal molecules change their orientation depending on the magnitude of a pixel voltage, so that polarization of light passing through the liquid crystal layer 3 changes. The change in the polarization is represented by the change in transmittance of light by the polarizer that is attached to the liquid crystal panel assembly 300.

By repeating the process by a unit of one input horizontal period (referred to as "1H", the same as one period of a horizontal synchronizing signal Hsync), the gate-on voltage Von is sequentially applied to all gate lines $G_1$-$G_n$ and thus a data voltage is applied to all pixels PX, so that an image corresponding to one frame is displayed once for one frame.

A state of an inversion signal RVS that is applied to the data driver 500 is controlled so that when a next frame starts the polarity of a data signal that is applied to each pixel PX is opposite to the polarity in a previous frame ("frame inversion"). According to characteristics of the inversion signal RVS, even within one frame, the polarity of a data voltage flowing through one data line may be changed (e.g.: row inversion and dot inversion), and the data voltages applied to rows of pixels may be different from each other (for example, column inversion or dot inversion). The polarity of the impulsive data voltage may be changed according to the inversion signal RVS, or may be an arbitrary polarity.

A method of driving a liquid crystal display, according to an exemplary embodiment of the present invention, will be described in detail with reference to FIGS. 3 and 4.

The liquid crystal display operates in a normal black mode or a normal white mode. In a liquid crystal display of a normal black mode, when an electric field is not formed between the pixel electrode and the common electrode as a data voltage is not applied to a pixel PX, the pixel expresses maximum luminance and the screen displays a white color.

Figure 4:
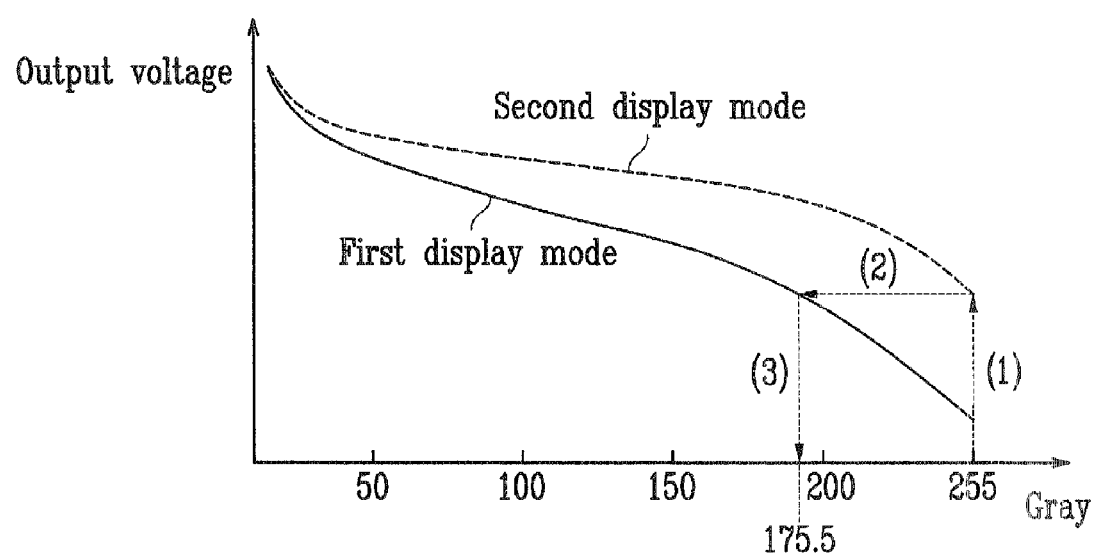
FIG. 4 is a graph illustrating an output voltage for a gray of the liquid crystal display according to an exemplary embodiment of the present invention.

FIG. 4 is a graph illustrating an output voltage for each gray where there is a lot of white color and where there is very little white color on a display screen of the liquid crystal display according to an exemplary embodiment of the present invention. In FIG. 4, the solid line (hereinafter, referred to as a "first display mode") illustrates an example of when there is not much white on the display screen and the dotted line (hereinafter, referred to as a "second display mode") illustrates an example of when there is a lot of white.

Referring to FIG. 4, the liquid crystal display operates in the first display mode when there is not much white color on the display screen of the liquid crystal, and operates in the second display mode when there is a lot of white color. The liquid crystal display operates in the first mode when representing a gray among a plurality of pixels as a value in a first range of predetermined values which is below a second range of predetermined values. The liquid crystal display operates in the second mode when representing a gray among a plurality of pixels as a value in the second range of predetermined values or greater than the second range. The first predetermined range of values and the second predetermined range of values can randomly determined based on the type of the liquid crystal display. A liquid crystal display according to at least one embodiment of the present invention may further include a judgment unit (not shown) that determines whether a display device operates in the first display mode or the second display mode. The judgment unit selects an operation mode based on the input image signals R, G, and B that include information about luminance. The judgment unit may be included in the signal controller 600 or may be independent of the signal controller 600. The judgment unit can select an operation mode automatically based on a luminance state of the displayed screen, or a user may select the mode manually.

In the first display mode, the relationship of a gray level and an output voltage is determined based on a gamma curve of the liquid crystal display. FIG. 4 shows the relationship between a gray value and an output voltage in a liquid crystal display in a normally white mode, and shows that the output voltage approximately decreases as the gray value increases.

In the second display mode, an output voltage corresponding to a gray range that is lower than that in the first display mode is applied. For example, when the gray range is 8 bits for 256 grays, a voltage corresponding to a gray lower than 256 grays is applied to display full white. Therefore, when the liquid crystal display of a normal white mode as in FIG. 4 is in the second display mode, an output voltage that is higher than that of the first display mode is applied.

Although not shown in the drawings, when the liquid crystal display of a normally black mode is in the second display mode, an output voltage that is lower than that of the first display mode is applied.

As an example, if image data of 255 grays is input, a process of finding an output voltage corresponding to 255 grays on a curved line of the second display mode is performed (1).

Next, a process of finding a point corresponding to the same output voltage as an output voltage that is found at the process (1) on the curved line of the first display mode is performed (2). Thereafter, a process of finding a gray value of the corresponding point is performed (3).

The converted gray value in this example is 175.5. However, a gray value at 175.5 cannot be properly represented using 8 bits of data and requires a dithering control of expressing a gray larger than 8 bits is required. A method of expressing more grays than the liquid crystal display can normally represent uses dithering control. The dithering control will be described in detail with reference to FIGS. 3 and 5.

Figure 5:
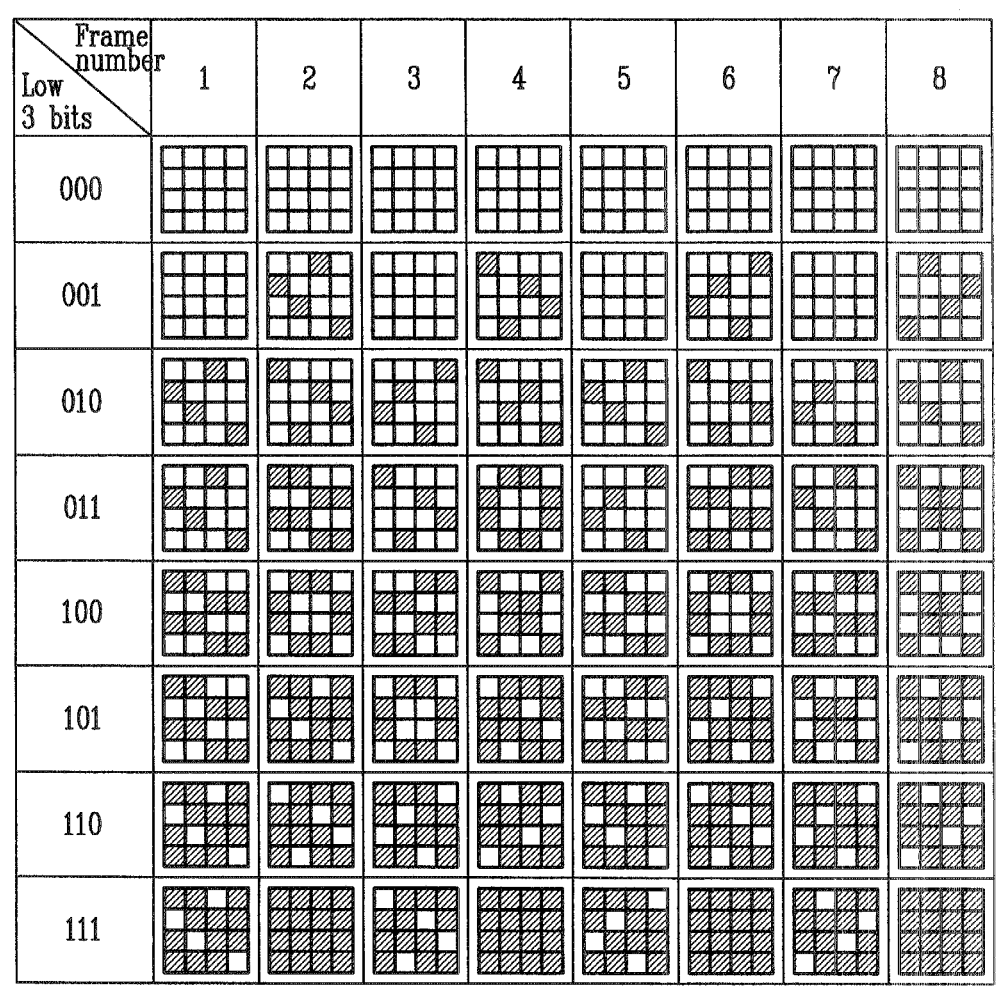

FIG. 5 is an example of a dithering data pattern set according to an exemplary embodiment of the present invention.

The dithering data pattern set shown in FIG. 5 is stored in the lookup table of the image signal converter 610, and each of the dithering data patterns belonging to the dithering data pattern set is determined based on a frame number and a lower 3 bit value of the corrected image data. Accordingly, a total of 64 dithering data patterns are present in the lower 3 bit values (000, 001, 010, 011, 100, 101, 110 and 111) of eight continuous frames. A data pattern may not be separately determined when a value of the lower 3 bits is (000), and when this occurs, only 56 dithering data patterns which excludes 8 dithering data patterns are stored in a lookup table.

As shown in FIG. 5, a basic unit of spatial arrangement in each dithering data pattern is a 4×4 data matrix. A data element of each dithering data pattern has a value of "1" or "0". In the drawings, a data element having a value of "0" is displayed with a white color and a data element having a value of "1" is displayed with slash marks.

The dithering controller 612 selects one of a plurality of dithering data patterns based on a frame number and a lower 3 bit value of the data in the corrected image data of a pixel, and reads a value of a data element corresponding to a position of the pixel among 16 data elements of the dithering data pattern, thereby determining an output image data DAT to output to the data driver 500.

Specifically, when a value of a data element in the selected position is "0", the dithering controller 612 determines a value of a gray that is determined by an upper 8 bits of the corrected image signal as a value of a final gray. However, when a value of a data element that is stored in a corresponding position is "1", the dithering controller 612 determines a value that adds "1" to a value of the determined gray of the upper 8 bits as a value of a final gray. The signal controller image outputs 8 bit image data DAT corresponding to the final gray to the data driver 500.

However, if a data pattern is not separately determined when the lower 3 bits are (000), the dithering controller 612 determines a value of a gray that is determined by upper 8 bits of the corrected image signal as a value of a final gray when the lower 3 bits of the corrected image signal are (000).

When the lower 3 bits are (000), all data elements of a dithering data pattern corresponding to all frames have a value of "0". When the lower 3 bits are (001), all data elements of a dithering data pattern corresponding to odd-numbered frames have a value of "0", and 12 out of 16 of the data elements, i.e., 3 out of every 4 data elements, have a value of "0" and the remaining ¼ have a value of "1", in dithering data patterns corresponding to even-numbered frames.

When the lower 3 bits are (010), 12 out of 16 data elements, i.e., 3 data elements out of every 4 data elements, have a value of "0" and the remaining ¼ have a value of "1", in dithering data patterns corresponding to all frames.

When the lower 3 bits are (011), 12 out of 16 data elements, i.e., 3 out of every 4 data elements, have a value of "0" and the remaining ¼ have a value of "1", of a dithering data pattern corresponding to the odd-numbered frames, and 8 out of 16 data elements, i.e., 1 out of every 2 data elements, have a value of "0" and the remaining ½ have a value of "1", in dithering data patterns corresponding to even-numbered frames.

When the lower 3 bits are (100), 8 out of 16 data elements, i.e., 1 out of every 2 data elements have a value of "0" and the remaining ½ have a value of "1", of a dithering data patterns corresponding to all frames. When the lower 3 bits are (101), 8 out of 16 data elements, i.e., 1 out of every 2 data elements have a value of "0" and the remaining ½ have a value of "1", in dithering data patterns corresponding to odd-numbered frames, and 4 out of 16 data elements, i.e., 1 out of every 4 data elements, has a value of "0" and the remaining ¾ have a value of "1", in dithering data patterns corresponding to even-numbered frames.

When the lower 3 bits are (110), 4 out every 16 data elements, i.e., 1 out of every 4 data elements, have a value of "0" and the remaining ¾ have a value of "1", in dithering data patterns corresponding to all frames. When the lower 3 bits are (111), all elements of the dithering data pattern corresponding to even-numbered frames have a value of "1", and 4 out of every 16 data elements, i.e., 1 out of every 4 data elements, have a value of "0" and the remaining ¾ have a value of "1", in dithering data patterns corresponding to odd-numbered frames.

In this way, in eight frames, a rule in which the number of data elements having a value of "0" and "1" among 16 data elements of the dithering data pattern changes depending on a value of the lower 3 bits follows a spatial dithering control principle.

Furthermore, with respect to each value of the lower 3 bits, for one data element in any given position, the number of data elements having a value of "0" or "1" is determined based on a value of the lower 3 bits, and this follows a rule of temporal dithering control.

Because a gray value that the liquid crystal display cannot normally represent can be displayed by extending the bit count using a dithering control, a gray of the second display mode is lowered, compared to that of the first display mode, and a voltage of the second display mode is increased, compared to that of the first display mode.

As described above, when a phase retardation Δnd of a liquid crystal of a liquid crystal display is high, a yellowish phenomenon may occur on a white display screen. However, according to at least one embodiment of the liquid crystal display of the present invention, a screen that mainly displays white is operated by lowering a gray and increasing an output voltage. Accordingly, even if phase retardation Δnd of the liquid crystal is high, it is possible to improve or prevent the yellowish phenomenon. Further, when the liquid crystal display according to the present invention displays a screen having very little white color, a phase retardation value Δnd of the liquid crystal of the liquid crystal display is high and thus transmittance is good, making it possible to drive a display device with low power consumption.

Having described exemplary embodiments of the present invention, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) having a plurality of pixels, comprising:
   a first substrate;
   a second substrate that is disposed opposite to the first substrate; and
   a liquid crystal layer that is interposed between the first and second substrates,
   wherein the LCD operates in a first display mode when a number of the pixels that are assigned gray values within a gray range is less than a predetermined value,
   wherein the LCD operates in a second display mode when the number of pixels is equal to or greater than the predetermined value, the gray values representing a white gray, and
   wherein a pixel has a lower luminance during the second display mode than the pixel during the first display mode.

2. The liquid crystal display of claim 1, wherein a phase retardation value of the liquid crystal layer ranges from about 420 nm to about 520 nm.

3. The liquid crystal display of claim 2, wherein the liquid crystal display is a normal white mode.

4. The liquid crystal display of claim 3, wherein a voltage of a pixel in the second display mode is higher than that of a pixel in the first display mode.

5. The liquid crystal display of claim 2, wherein the liquid crystal display is a normal black mode.

6. The liquid crystal display of claim 5, wherein a voltage of a pixel in the second display mode is lower than that of a pixel in the first display mode.

7. The liquid crystal display of claim 2, wherein the gray value of the second display mode is determined through a dithering process.

8. The liquid crystal display of claim 7, further comprising an image signal converter that converts an input image signal of a first gray to an output image signal of a second gray and outputs the image signal of the second gray.

9. The liquid crystal display of claim 8, wherein the input image signal has a first bit count and the image signal converter adds a second bit count of a weighted image signal to the first bit count to convert the input image signal to a corrected image signal having a third bit count.

10. The liquid crystal display of claim 9, wherein the image signal converter stores a plurality of dithering data patterns including data elements having a first value or a second value, selects a dithering data pattern corresponding to the second bit count of the corrected image signal among the plurality of dithering data patterns, and outputs the corrected image signal after converting it to an output image signal of a fourth bit count that is less than the third bit count based on the selected dithering data pattern.

11. The liquid crystal display of claim 10, wherein the image signal converter comprises:
   a lookup table that stores the plurality of dithering data patterns; and
   a dithering controller that outputs the corrected image signal based on the plurality of dithering data patterns that are stored in the lookup table.

12. A method of driving a liquid crystal display having a plurality of pixels, a first substrate, a second substrate that is disposed opposite to the first substrate, and a liquid crystal layer having a phase retardation value ranging between about 420 nm to about 500 nm that is interposed between the first and second substrates, comprising:
   determining a predetermined gray range in which the pixels represent white grays, and determining a predetermined value; and
   operating the liquid crystal display in a first mode if it is determined that a number of the pixels representing grays in the predetermined gray range is less than the predetermined value, and
   operating the liquid crystal display in a second mode if it is determined that the number of pixels is equal to or greater than the predetermined value.

13. The method of claim 12, wherein a gray value of a pixel in the second display mode is less than that of a pixel in the first display mode.

14. The method of claim 13, wherein the liquid crystal display is a normal black mode.

15. The method of claim 14, wherein voltage of a pixel in the second display mode is lower than that of a pixel in the first display mode.

16. The method of claim 15, further comprising:
   adding a second bit count of a weighted image signal to a first bit count of an image signal to convert the input signal to a corrected image signal having a third bit count.

17. The method of claim 16, further comprising:
   storing a plurality of dithering data patterns including data elements having a first value or a second value;
   selecting a dithering data pattern corresponding to the second bit count of the corrected image signal among the plurality of dithering data patterns; and
   outputting the corrected image signal after converting it to an output image signal of a fourth bit count that is less than the third bit count based on the selected dithering data pattern.

18. The liquid crystal display of claim 1, wherein the gray range includes at least two different gray values.

19. The method of claim 12, wherein the gray range includes at least two different gray values.

20. The method of claim 12, wherein a pixel has a lower luminance during the second display mode than the pixel during the first display mode.

* * * * *